United States Patent [19]

Kurachi et al.

[11] Patent Number: 5,152,067
[45] Date of Patent: Oct. 6, 1992

[54] APPARATUS FOR MEASURING INTERPUPILARY DISTANCE OF MOUNTED SPECTACLES

[75] Inventors: Mikio Kurachi, Aichi; Toshiaki Mizuno, Gamagori; Noritugu Nozawa, Toyokawa, all of Japan

[73] Assignee: Nidek Co., Ltd., Gamagori, Japan

[21] Appl. No.: 842,482

[22] Filed: Feb. 27, 1992

[30] Foreign Application Priority Data

Feb. 28, 1991 [JP] Japan .................................. 3-057796

[51] Int. Cl.$^5$ ............................ A01B 3/10; G01B 9/00
[52] U.S. Cl. ........................................ 33/200; 33/507
[58] Field of Search .................................. 33/507, 200

[56] References Cited

U.S. PATENT DOCUMENTS 4,098,002 7/1978 Campbell et al. .
4,571,842 2/1986 Ikezawa et al. ...................... 33/200

FOREIGN PATENT DOCUMENTS 60-17335 1/1985 Japan .

Primary Examiner—Harry N. Haroian
Attorney, Agent, or Firm—Finnegan, Henderson, Farabow, Garrett and Dunner

[57] ABSTRACT

A lens meter for measuring the optical character of spectacle lenses by projecting a measurement target onto the spectacle lens comprises a first position control member for moving a spectacle frame in a horizontal direction, and a second position control member for moving the spectacles in a direction perpendicular to the direction of the first position control member. The position of the second position control member is detected by a potentiometer, and the pupilary distance is calculated based on the distances from the second position control member to the bridge center of the spectacle frame and to each lens optical center on the spectacle frame.

22 Claims, 5 Drawing Sheets

APPARATUS FOR MEASURING INTERPUPILARY DISTANCE OF MOUNTED SPECTACLES

BACKGROUND OF THE INVENTION

1. Field of the Invention

The present invention relates to lens meters, and more particularly to an apparatus for measuring the interpupilary distance of spectacles mounted to a lens meter.

2. Description of Related Art

Conventionally, there are lens meters which measure the refractive power, axis, prism power and other characteristics of a spectacle lens, as shown in, for example, Japanese Patent Application Laid-open No. 60-17335. There is also provided an apparatus having an additional function of measuring the distance between optical centers of both of the lenses for the right and left eyes, in which the lenses are mounted on a spectacle frame (both eyes, pupilary distance (P.D.)) and the distance from a nose bridge center to an optical center of a right eye lens or a left eye lens (single eye's pupilary distance (P.D.)). In this specification, the interpupilary distance (P.D.) includes the binocular P.D. and the monocular P.D.

Another apparatus is disclosed in U.S. Pat. No. 4,098,002 to Campbell et al.. As shown in FIG. 1 of Campbell et al., at least one pad simulating the shape and location of the human nose, contacts the nose bridge of spectacles, slides on a bar which extends transversely of an optical path, whereby an optical center of a lens is matched to a measurement optical axis of the optical path. From that moving position of the pad, the monocular P.D. is measured. The apparatus has two pads for both of the lenses for right eye and left eye respectively. By calculating the right eye's P.D. plus the left eye's P.D., binocular P.D. is measured.

According to the above apparatus, there is an advantage of being able to measure the interpupilary distance when measuring the refractive power of a lens at the same time. However, there are following problems in this apparatus. First, the pad interferes with parts of lens fixing member. To remedy this, it is necessary to provide a pair of moving pads and a mechanism to detect their position. Therefore, the apparatus becomes very complex in structure and is very expensive.

Second, measuring only the refractive power of a lens mounted on a spectacle frame, similar to measuring the P.D., involves a different operation from the usual measurement of a lens meter. That is, after measuring one lens it is necessary to remove the spectacles from the pad and mount them on another pad. Even though the pad had been moved to the side position where it does not interfere with the parts by modification, the lens table becomes very large in size.

SUMMARY OF THE INVENTION

The present invention has been made in view of the above circumstances and has an object to overcome the above problems and to provide an apparatus for measuring the interpupilary distance of spectacles mounted to a lens meter.

Another object of the present invention is providing an apparatus for measuring interpupilary distance that has a simple structure and is easy to operate.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the lens meter of this invention comprises a guide member for guiding the bridge center of the spectacle frame to a determined position, a first position control member mounted on a lens meter body and movable in a direction perpendicular to a line along which the interpupilary distance is measured for aligning the spectacle frame, a second position control member movable in a direction parallel to the line along which the interpupilary distance is measured for engaging an ear side of the spectacle frame, means for connecting the second position control member to the first position control member, means for detecting the position of the second position control member, and means for calculating the pupilary distance based on the distance from the second position control member to the bridge center of the spectacle frame and the distance from the second position control member to each lens optical center on the spectacle frame.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENTS

A detailed description of one preferred embodiment of an apparatus for measuring the interpupilary distance of mounted spectacles to lens meter embodying the present invention will now be given referring to the accompanying drawings.

Figure 1:
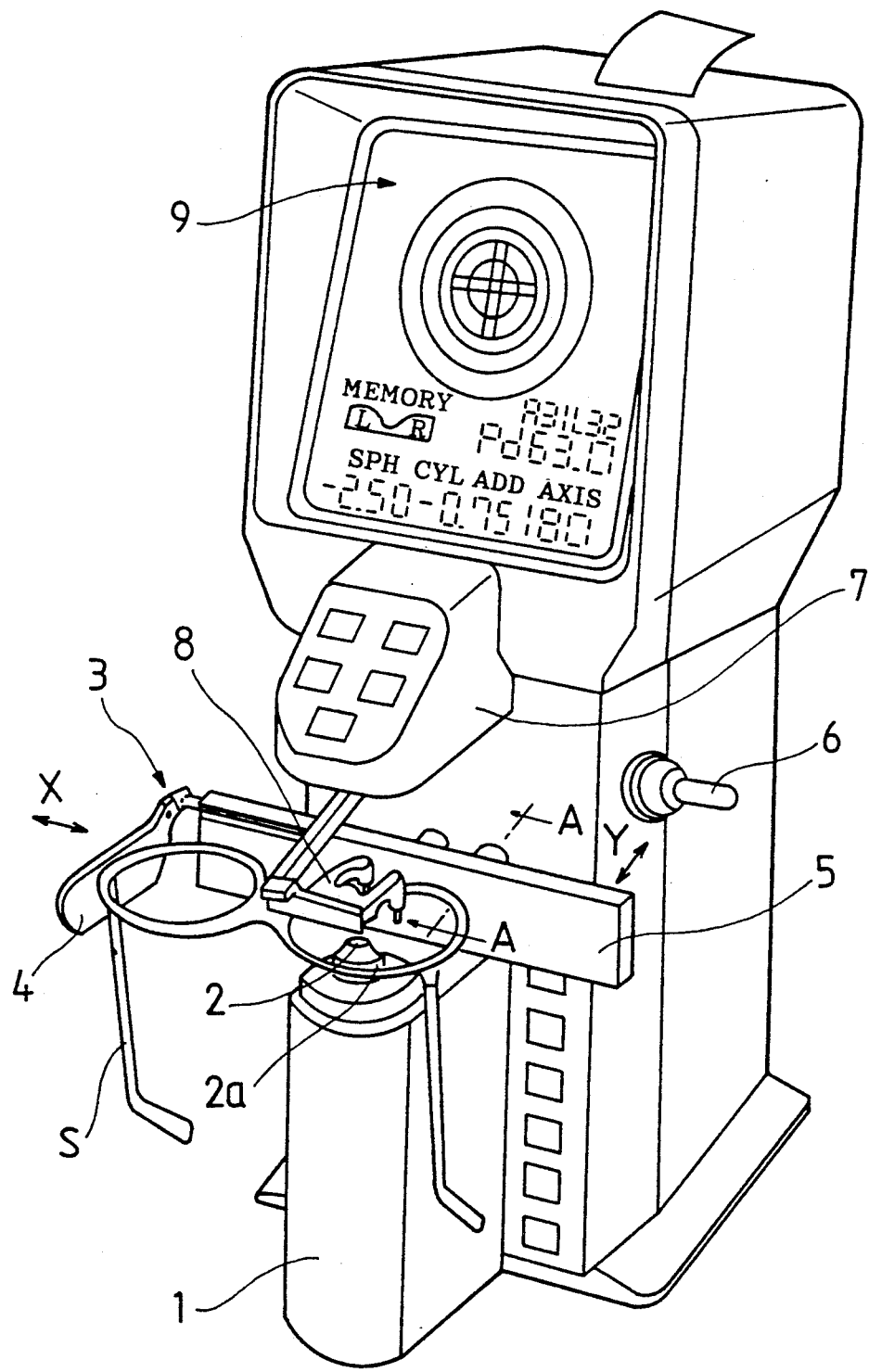
FIG. 1 is a perspective view of the apparatus for measuring the interpupilary distance of spectacles mounted to a lens meter.

In FIG. 1, there is shown an auto-lens meter including a projection optical system for projecting a measurement target onto a lens to be examined, a lens support member on which the lens to be examined is supported, a detecting optical system for detecting the displacement by receiving a measurement beam which has passed through the lens to be examined, a control system for processing by controlling the apparatus, a monitor for displaying a mark for alignment and the measurement results, and switches for selecting a measurement mode or a display mode. As the optical system of the lens meter to measure the refractive power of a spectacle lens is well known, an explanation is omitted. This feature is disclosed in Japanese Patent Application Laid-open No. 60-17335.

The projecting optical system is stored in a projecting system storage body 1 and a lens support member 2 is disposed above the projecting optical system. The surface of lens support member has an aperture allowing the projecting optical system to project a measurement light to a lens to be examined.

A positioning mechanism 3 to position a lens to be examined includes an alignment plate 4 movable in the X direction shown by an arrow in FIG. 1. The X direction is parallel to the line along which the interpupilary distance is measured and is referred to as the size direction of the spectacle frame. A receiving member 5 is movable in the Y direction. The Y direction is perpendicular to the X direction and is referred to as the height direction of the spectacle frame. The positioning mechanism 3 is used for positioning spectacles, and also used for measuring the pupilary distance. The receiving member 5 is moved by operating a lever 6.

A part of the detecting optical system is stored in a detecting system storage body 7. From an aperture in the bottom face of the body 7, a measurement light is directed to a light receiving device in the apparatus. A lens fixing member 8 is fixed to the lens meter body at the base end and is movable in the vertical direction at the top end. A monitor 9 displays a mark for alignment or a result of measurement.

Figure 2:
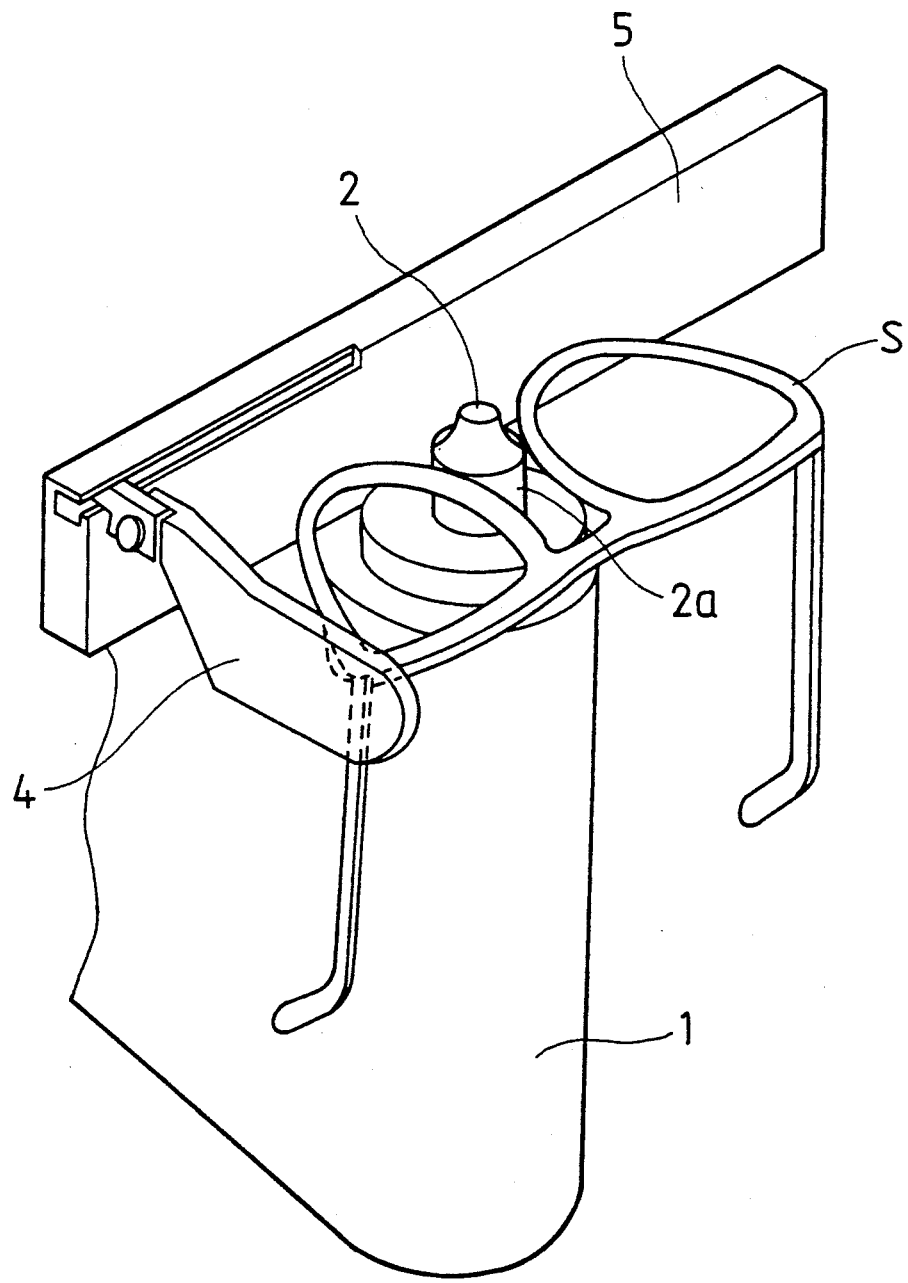
FIG. 2 is an enlarged portion of the positioning mechanism of the apparatus embodying this invention.

In FIG. 2, the positioning mechanism 3 is shown enlarged. A nose piece 2a, located below the surface of the lens support member 2, is cylindrically shaped and has a slightly larger diameter than the bridge width (nose width) so as to guide the bridge center of the spectacle frame to a determined position by aligning a nose part of the spectacle frame. However, the shape of the nose piece 2a need not be cylindrical and several shapes simulating the shape of the human nose can be used. The spectacles S (i.e., the whole spectacle frame on which lenses are mounted) are pushed against the receiving member 5, whereby the degree of parallelization to the receiving member 5 is obtained.

Figure 3:
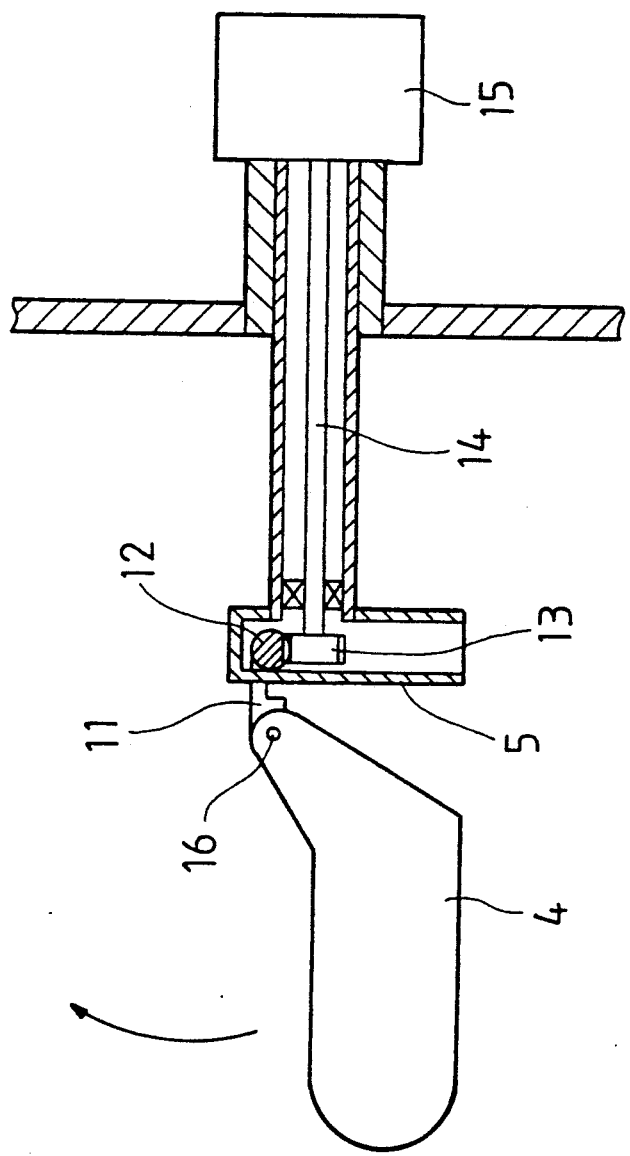
FIG. 3 is a sectional view substantially along the lines A—A of FIG. 1.

As shown in FIG. 3, the alignment plate 4 is connected to a rack 12 which is supported in the receiving member 5 by a connecting member 11. The alignment plate 4 moves in the direction parallel to the longitudinal axis (X-direction in FIG. 1) of the receiving member 5 with the rack 12. The rack 12 is connected to a pinion 13 supported in the receiving member 5, which is connected to a transmission shaft 14 elongated from the lens meter. To the base end of the transmission shaft 14 a potentiometer 15 is connected. Therefore, the pinion 13 is rotated due to the moving of the rack 12. The rotation of the pinion 13 is transmitted to the potentiometer 15 via the transmission shaft 14, whereby the position of the alignment plate 4 is detected by the potentiometer 15. The alignment plate 4 is rotatable (in the direction of the arrow in FIG. 3) around a shaft 16 which connects the alignment plate 4 to the connecting member 11 when it interrupts measurement.

Figure 4:
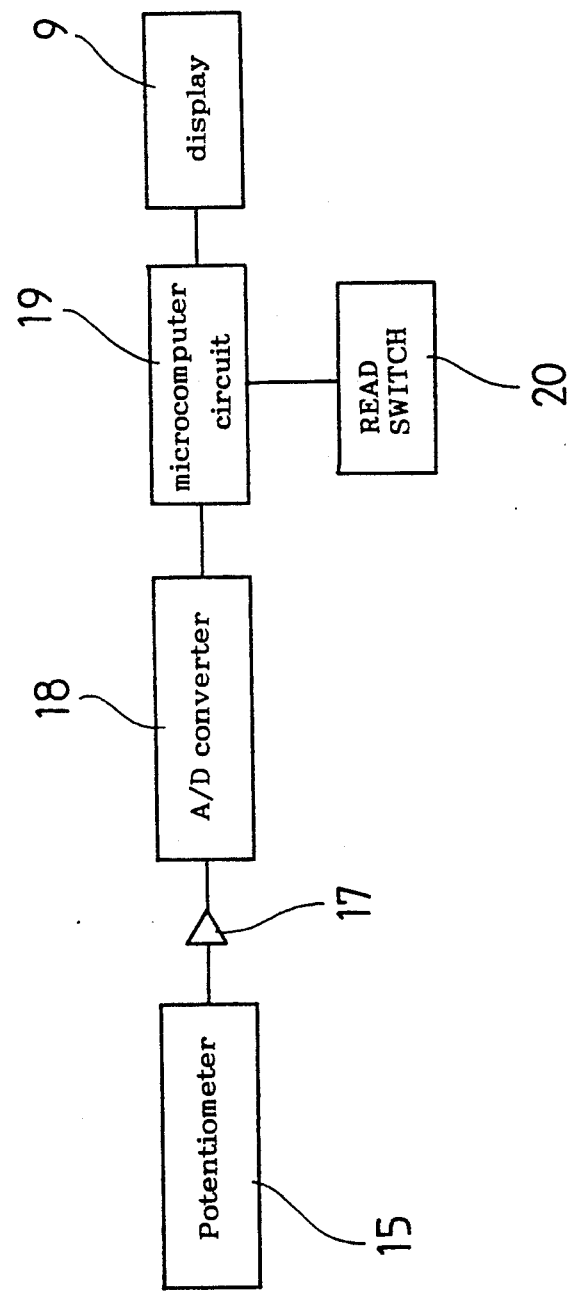
FIG. 4 is an electrical control block diagram for the apparatus embodying this invention.

FIG. 4 shows the means for detecting the position of the alignment plate 4. An analog signal outputted from the potentiometer 15 is amplified by an amplifier 17, thereafter converted to a digital signal by an A/D converter 18 and is transmitted to a microcomputer circuit 19. The microcomputer circuit 19 processes the signal and detects the position of the alignment plate 4 successively. A read switch 20 instructs a reading of the measurement value.

Figure 5A:
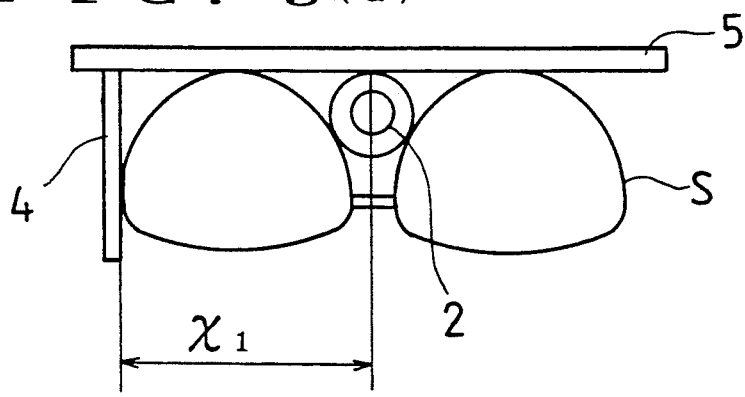
FIG. 5(a) through 5(c) are diagrams to show the arrangement for measuring interpupilary distance.

According to the above apparatus, the measurement operation is explained as follows. First, after changing to the P.D. measure mode, the nose part of the spectacles S to be measured is set up on the nose piece 2a of the lens support member 2. Thereafter, the receiving member 5 is moved in the Y direction, and comes into contact with the bottom part of the spectacle frame. The alignment plate 4 then contacts one ear side of the frame by being slid along the receiving member 5. In this condition, by depressing the read switch 20, the distance $X_1$ from the central axis of the lens support member 2 to the alignment plate 4 is measured, as shown in FIG. 5(a).

Figure 5B:
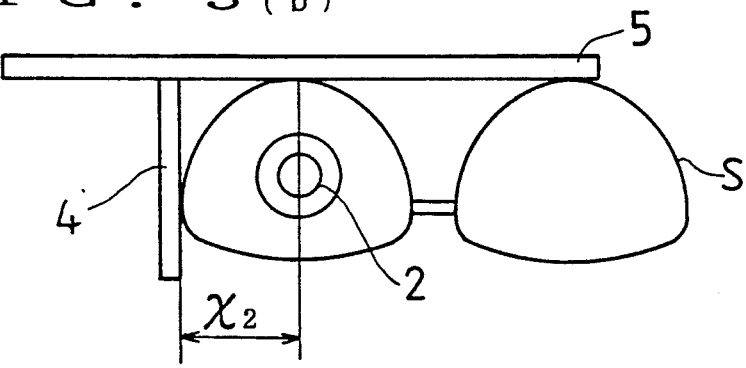

In FIG. 5(b), the spectacles S are removed from the nose piece 2a of the lens support member 2. Again, by moving the receiving member 5 and the alignment plate 4, which are in contact with the frame of the spectacles S, the lens for the left eye is set up on the lens supporting member 2. By confirming the position of the mark for alignment in the screen of the monitor 9, and moving the spectacles S, the alignment between the optical center of the left eye lens and the measurement optical axis is accomplished. Once aligned, the refractive power of the left eye lens and the distance $X_2$ from the central axis of the lens support member 2 to the alignment plate 4 are measured by pressing the read switch 20.

Figure 5C:
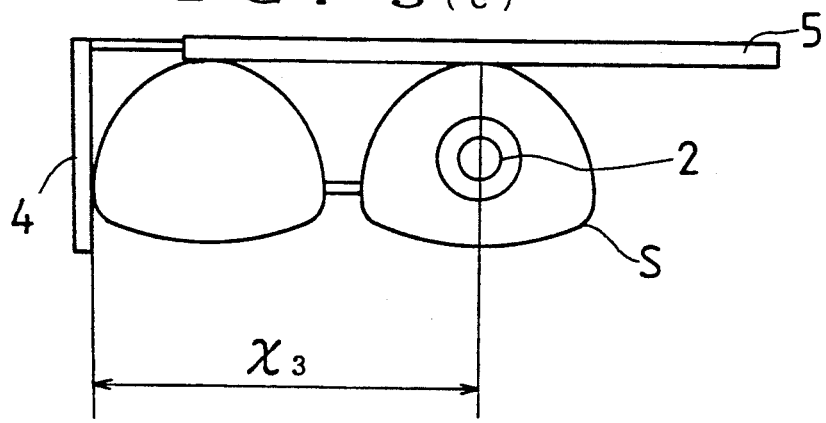

In FIG. 5(c) the lens for the right eye is set up on the lens support member 2 (similar to the left eye lens) and the distance $X_3$ from the central axis of the lens support member 2 to the alignment plate 4 is measured.

By processing the data, $X_1$, $X_2$, and $X_3$, the P.D. values are calculated as follows.

binocular P.D. value = $X_3 - X_2$
left eye's P.D. value = $X_1 - X_2$
right eye's P.D. value = $X_3 - X_1$ Each P.D. value is displayed on the screen of the monitor 9 with the refractive power of the lens.

The present invention may be embodied in other specific forms without departing from the spirit or essential characteristics thereof. For instance, in the above embodiment, although the nose piece 2a is used to guide the nose bridge center of the spectacle frame to the determined position, the same result can be obtained by measuring the distance from the nose bridge center to the ear side of the spectacle frame. Namely, as the guided position becomes the certain basic position, it is not necessary to align the spectacles with the measurement optical axis. Therefore, it is enough that the guide member is positioned so as not to interrupt the operation.

Furthermore, the positioning is not an essential condition for the optical center of the lens to be examined. The measurement optical axis of the lens meter can be obtained from the distance from the lens optical axis indirectly, from the relation between the measuring position and the prism power at that position.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter for measuring the optical characteristics of spectacle lenses mounted in a spectacle frame having a bridge center, said lens meter projecting a measurement target onto the spectacle lenses, comprising:
   a guide member for guiding the bridge center of the spectacle frame to a determined position;
   a first position control member mounted on a lens meter body and movable in a direction perpendicular to a line along which the interpupilary distance is measured for aligning the spectacle frame;
   a second position control member movable in a direction parallel to the line along which the interpupilary distance is measured for engaging an ear side of the spectacle frame;
   means for connecting said second position control member to said first position control member;
   means for detecting the position of the second position control member; and
   means for calculating the pupilary distance based on the distance from the second position control member to the bridge center of the spectacle frame and the distance from the second position control member to each lens optical center on the spectacle frame.

2. The lens meter according to claim 1, wherein said connecting means is connected to said first position control member such that said second position control member is movable relative to said first position control member.

3. The lens meter according to claim 2, wherein said connecting means comprises a movable member supported in said first position control member and connected to said second position control member, said movable member movable in a direction parallel to the line along which the interpupilary distance is measured 4. The lens meter according to claim 3, wherein said movable member includes a rack connected to a pinion in said first position control member, and wherein a movement of said rack in a direction parallel to the line along which the interpupilary distance is measured permits said pinion to rotate.

5. The lens meter according to claim 4, wherein said second member detecting means includes a potentiometer for detecting the amount of rotation of said pinion.

6. The lens meter according to claim 5, wherein said potentiometer is connected to a transmission shaft joined axially to said pinion.

7. The lens meter according to claim 6, wherein said potentiometer is connected to a computer circuit through an amplifier and an A/D converter, and a signal process in the computer circuit detects a displacement of the spectacle lens in the direction parallel to said lens body.

8. The lens meter according to claim 1, wherein said guide member serves as a part of a lens support member on which the lens to be examined rests.

9. The lens meter according to claim 1, wherein said calculating means outputs the monocular pupilary distance by processing a distance from an ear side to a bridge center of a spectacle frame detected by said second member detecting means, and a distance from the ear side to an optical center of one of the spectacle lenses detected by said second member detecting means.

10. The lens meter according to claim 9, wherein said calculating means outputs the interpupilary distance by processing both a distance from an ear side to a bridge center of a spectacle frame detected by said second member detecting means and a distance from the ear side to each optical center of a right eye lens and a left eye lens detected by said second member detecting means.

11. The lens meter according to claim 1, wherein said second position control member is rotatable about an axis parallel to said first position control member.

12. A lens meter for measuring the optical characteristics of spectacle lenses mounted in a spectacle frame having a bridge center, said lens meter projecting a measurement target onto the spectacle lenses, comprising:
   a lens support member for supporting the lens to be examined;
   positioning means for moving the lens in a height direction and in a size direction of the spectacle frame;
   means for detecting a moved position of the lens in the size direction determined by the positioning means;
   means for calculating the interpupilary distance on the basis of an amount of movement of each lens in the size direction.

13. The lens meter according to claim 12, wherein said lens support member comprises a nose piece to support a bridge part of the spectacle frame.

14. The lens meter according to claim 12, wherein said positioning means comprises a receiving member for moving the lens frame supported on the lens support member in the height direction and an alignment member for moving the lens frame supported on the lens support member in the size direction.

15. The lens meter according to claim 14, wherein said alignment member is connected to a movable member movable in the size direction, and a movement of the movable member in a size direction permitting said alignment member to move in the size direction.

16. The lens meter according to claim 15, wherein said movable member is a rack connected to a pinion in said receiving member, and a movement of said rack in the size direction permits said pinion to rotate.

17. The lens meter according to claim 16, wherein said means for detecting the position includes a potentiometer which detects the amount of rotation of said pinion.

18. The lens meter according to claim 17, wherein said potentiometer is connected to a transmission shaft joined axially to said pinion.

19. The lens meter according to claim 17, wherein said potentiometer is connected to a computer circuit through an amplifier and an A/D converter, and a signal process in the computer circuit detects a displacement of the spectacle lens in the size direction.

20. The lens meter according to claim 12, wherein said calculating means outputs a monocular pupilary distance by processing a distance from an ear side to a bridge center of the spectacle frame detected by said means for detecting the position and a distance from the ear side to an optical center of one of the spectacle lenses detected by said means for detecting the position.

21. The lens meter according to claim 20, wherein said calculating means outputs the interpupilary distance by processing both a distance from an ear side end to a bridge center of the spectacle frame detected by the means for detecting the position and a distance from the ear side to each optical center of a right eye lens and a left eye lens detected by the means for detecting the position.

22. The lens meter according to claim 15, wherein said alignment member is rotatable around said movable member.

* * * * *

UNITED STATES PATENT AND TRADEMARK OFFICE
CERTIFICATE OF CORRECTION

PATENT NO. : 5,152,067
DATED : October 06, 1992
INVENTOR(S) : Mikio KURACHI et al.

It is certified that error appears in the above-identified patent and that said Letters Patent is hereby corrected as shown below:

Claim 3, column 5, line 36, after "measured" insert to --.--.

Signed and Sealed this

Twenty-sixth Day of October, 1993

Attest:

BRUCE LEHMAN

Attesting Officer      Commissioner of Patents and Trademarks